United States Patent [19]
van der Heide et al.

[11] Patent Number: 5,684,080
[45] Date of Patent: Nov. 4, 1997

[54] AQUEOUS POLYMER EMULSION

[75] Inventors: Evert van der Heide; Gerrit Vietje, both of Amsterdam, Netherlands; Pen-Chung Wang, Houston, Tex.

[73] Assignee: Shell Oil Company, Houston, Tex.

[21] Appl. No.: 559,523

[22] Filed: Nov. 15, 1995

[51] Int. Cl.$^6$ .............................. C08K 5/06; C08G 67/02
[52] U.S. Cl. ..................... 524/502; 524/366; 524/368; 528/392
[58] Field of Search ........................... 524/366, 368, 524/502, 612; 528/392

[56] References Cited

U.S. PATENT DOCUMENTS

| | | | |
|---|---|---|---|
| 2,495,286 | 1/1950 | Brubaker | 260/63 |
| 3,950,510 | 4/1976 | Adams | 424/70.22 |
| 4,024,326 | 5/1977 | Hudgin | 526/11.1 |
| 4,122,067 | 10/1978 | Anderson | 528/89 |
| 4,797,459 | 1/1989 | Cascurida | 524/368 |
| 5,236,974 | 8/1993 | Dreischhoff et al. | 523/403 |
| 5,322,876 | 6/1994 | Sasaki et al. | 524/366 |

FOREIGN PATENT DOCUMENTS

| | | |
|---|---|---|
| 0121965 | 3/1984 | European Pat. Off. . |
| 0181014 | 9/1985 | European Pat. Off. . |
| 0372602 | 11/1989 | European Pat. Off. . |
| 0516238 | 5/1992 | European Pat. Off. . |

OTHER PUBLICATIONS

Kirk–Othmer Encyclopedia of Chemical Technology, Third Edition, vol. 2, Copyright 1978 by John Wiley & Sons, Inc., p. 448.

*Primary Examiner*—Tae Yoon

[57] ABSTRACT

An emulsion of a copolymer of carbon monoxide with an olefinically unsaturated compound dispersed in an aqueous diluent; a curable resin composition in the form of an oil-in-water emulsion comprising a copolymer of carbon monoxide with an olefinically unsaturated compound and a curing agent; and a process for producing a laminated wood composite comprising applying said curable resin composition onto wood parts of the composite, bringing the wood parts of the composite together such that curable resin composition is positioned between adjacent wood parts, and curing the curable resin such that after curing cured resin adheres adjacent wood parts to one another.

19 Claims, No Drawings

AQUEOUS POLYMER EMULSION

This invention relates to an aqueous emulsion of a polymer. In one aspect, the invention relates to a process for producing a laminated wood composite.

Laminated wood composites on the bases of a binder which is a heat cured, i.e. cross-linked, resin which adheres adjacent wood parts to one another exist for many years and form a mature market. Examples of laminated wood composites are plywood and laminated beam or timber. Examples of the conventional heat curable resins are urea formaldehyde resins and phenol formaldehyde resins. Although these resins are being used for many years the wood composites prepared therewith have an unsatisfactory performance in important market segments, viz., those wherein there is a demand for a high impact resistance or a demand for a good dimensional stability of the composite in the presence of moisture.

According to the non-prepublished PCT patent application No. PCT/EP95/04324 it has recently been found that improved wood composites can be obtained by using a binder which is based on a copolymer of carbon monoxide with an olefinically unsaturated compound and a curing agent. These composites have an improved impact resistance/strength balance and an improved dimensional stability. They are also tougher and more homogeneous than the conventional composites. It has also been indicated that, very advantageously, the composites maintain their strength and stiffness up to a temperature of about 140° C. when the binder has been applied as a thin layer. The application of such an unconventionally thin binder layer does not diminish the overall strength and stiffness of the composite.

In the conventional production of laminated wood composites the binders are generally made of high viscosity so that they remain in the glue line (cf. Kirk-Othmer Encyclopedia of chemical technology, third edition, Volume 2, page 448). Accordingly, a binder with a paste consistency was used for producing the laminated wood composites of the said PCT application. However, it is a disadvantage that a binder with a paste consistency can not so easily be applied as a thin layer.

It has now been found that the binder which is based on the copolymer of carbon monoxide with an olefinically unsaturated compound and a curing agent can very suitably be applied onto the wood parts when the binder is dispersed in an aqueous diluent as a so-called oil-in-water emulsion. If so desired, the binder in the form of an emulsion can be applied by spraying and it can form a thin layer, thereby remaining in the glue line. When using the binder at a very low application rate in the form of an aqueous emulsion, rather than by using a binder with a paste consistency, a more homogeneous distribution of the binder over the joints between the wood parts is obtained, which improves the quality of the laminated wood composite.

It has also been found that aqueous emulsions of the copolymer having a high stability can be prepared such that they can easily be handled, transported and stored over a long period of time, virtually without separation. If nevertheless separation has occurred, the emulsions can easily be re-dispersed by mechanical action, such as shaking or stirring. After addition of a curing agent the emulsions can retain an attractive stability level so that immediate application of the binder onto the wood is not necessary.

Accordingly, the present invention relates to an emulsion of a copolymer of carbon monoxide with an olefinically unsaturated compound dispersed in an aqueous diluent.

The invention also relates to a curable resin composition in the form of an oil-in-water emulsion comprising a copolymer of carbon monoxide with an olefinically unsaturated compound and a curing agent.

The invention also relates to a kit of parts of which a first part comprises either an oil-in-water emulsion of a copolymer of carbon monoxide with an olefinically unsaturated compound or an emulsifiable composition comprising a copolymer of carbon monoxide with an olefinically unsaturated compound and an emulsifier which is suitable for forming an oil-in-water emulsion of the copolymer, and of which a second part comprises a curing agent and optionally a diluent.

The invention also relates to a process for producing a laminated wood composite comprising applying a curable resin onto wood pans of the composite which curable resin comprises a composition in the form of an oil-in-water emulsion comprising a copolymer of carbon monoxide with an olefinically unsaturated compound and a curing agent, bringing the wood pans of the composite together such that curable resin is positioned between adjacent wood parts, and curing the curable resin such that after curing cured resin adheres adjacent wood parts to one another.

The invention also relates to a laminated wood composite comprising wood parts and a cured resin which adheres adjacent wood pans to one another, wherein the cured resin is obtainable by curing a curable resin composition comprising a copolymer of carbon monoxide with an olefinically unsaturated compound and a curing agent, which curable resin composition has been applied in a quantity per square meter of joint which is based on less than 30 g of the copolymer of carbon monoxide and an olefinically unsaturated compound.

The invention also relates to an article of manufacture comprising a laminated wood composite of this invention.

Although in the usual terminology the present emulsions are indicated as "oil-in-water" emulsions, it is to be understood that the continuous phase of the emulsion may in general be any aqueous diluent. This means that the continuous phase does not necessarily consist of water only; it may in addition contain an organic diluent which is miscible with water. In the emulsions of this invention the dispersed phase is usually a liquid. However, the skilled person will appreciate that in some embodiments the dispersed phase may comprise a solid or may be solid. These are considered to be embodiments of the invention, as well.

The binder used in the present invention is based on a copolymer of carbon monoxide and an olefinically unsaturated compound. Preferably the copolymer contains 1,4-dicarbonyl entities in its polymer chains because this arrangement accommodates certain curing reactions, such as the curing with poly-primary-amines, which will be elaborated hereinafter.

Copolymers of carbon monoxide and an olefinically unsaturated compound are known per se. They can be prepared by palladium catalyzed polymerization using the methods known from, for example, EP-A-121965, EP-A-181014, EP-A-372602 and EP-A-516238. The polymers so prepared may be linear alternating copolymers of carbon monoxide and the olefinically unsaturated compound(s), i.e. copolymers of which the polymer chains contain the monomer units originating in carbon monoxide (i.e. carbonyl groups) and the monomer units originating in the olefinically unsaturated compound(s) in an alternating arrangement, so that substantially every fourth carbon atom of the polymer chain belongs to a carbonyl group. Alternative copolymers of carbon monoxide and an olefinically unsaturated compound which contain 1,4-dicarbonyl entities may be random copolymers, i.e. copolymers of which the polymer chains contain said monomer units in a random order. The latter copolymers can be prepared, for example, by radical initiated polymerization using the methods known from, e.g., U.S. Pat. No. 2,495,286 and U.S. Pat. No. 4,024,326.

It is preferred to employ a linear alternating copolymer of carbon monoxide and an olefinically unsaturated compound because these have a higher content of carbonyl groups in the polymer chain than the random copolymers so that the curing can be accomplished easily at a high level of cross-linking. If, nevertheless, a low degree of cross-linking is desired, the presence of carbonyl groups, which are not converted in the curing reaction, may contribute advantageously to the mechanical properties of the binder, and hence to the properties of the wood composite.

The said copolymers of carbon monoxide and an olefinically unsaturated compound may be based on a hydrocarbon as the olefinically unsaturated compound, but the olefinically unsaturated compound may also contain a heteroatom, such as in vinyl acetate, ethyl acrylate and N-vinylpyrrolidone. It is preferred that the copolymer is based on an olefinically unsaturated hydrocarbon, in particular having up to 10 carbon atoms, suitably an α-olefin. The copolymer is preferably based on olefinically unsaturated compounds which comprise an α-olefin having three or more carbon atoms, in particular an aliphatic α-olefin having up to 6 carbon atoms. Very suitable are aliphatic α-olefins, in particular those having from 3 to 6 carbon atoms and more in particular those having a straight carbon chain, such as propene, 1-butene, 1-pentene and 1-hexene. Propene is most preferred.

The molecular weight of the copolymer may vary between wide limits. There is a preference for using copolymers which have a relatively low molecular weight, for example, a weight average molecular weight in the range of from 200 to 20,000, more preferably in the range of from 500 to 5000 and in particular from 1000 to 3000. The copolymers have typically a molecular weight distribution, such that their Q value amounts to 1.1–5, more typically 1.5–3, the Q value being the quotient of the weight average molecular weight and the number average molecular weight. It is advantageous to select copolymers which are liquid at the temperatures generally used in the processing of the copolymer or the binder, which is typically below 120° C., more typically below 100° C. and frequently in the range of 10–80° C., more frequently in the range of 20°–60° C. The processing of the copolymer encompasses, for example, the preparation of the emulsion of this invention, as described hereinafter. In this respect it is preferred to select copolymers which have a relatively low molecular weight, in particular those which are based on olefinically unsaturated compounds which comprise an o-olefin having three or more carbon atoms.

Very good results can be obtained with a linear alternating copolymer of carbon monoxide and propene which has a weight average molecular weight in the range of 500–5000.

The copolymer of carbon monoxide and an olefinically unsaturated compound can be dispersed into an aqueous diluent by using a suitable surfactant as the emulsifier, for example an anionic surfactant or a non-ionic surfactant. The number average molecular weight of the surfactant is typically at least 200, more typically at least 300 and a practicable maximum limit to the number average molecular weight is 50,000, in particular 40,000.

Non-ionic surfactants are preferred, in particular those which comprise in their molecular structure a hydrophilic moiety which is a moiety of a poly(ethene oxide) and a lypophilic moiety. For more clarity, such hydrophilic and lypophilic moieties present themselves as the so-called polymer blocks of a block copolymer. Examples of suitable lypophilic moieties are moieties of a polyester and moieties of a polyamide. A preferred lypophilic moiety is a moiety of poly(alkylene oxide) wherein alkylene is other than ethene, for example propene or 1-butene. Another preferred lypophilic moiety is a moiety of a copolymer of carbon monoxide and an olefinically unsaturated compound, in particular a copolymer which is of the same structure as the copolymer to be dispersed.

In the latter case the surfactant is a graft surfactant which can be formed by grafting a polymer comprising a poly(ethene oxide) moiety onto the copolymer to be emulsified. Suitable polymers which can form a surfactant contain a reactive group, preferably as a terminal or capping group, which is reactive towards functional groups present in the copolymer of carbon monoxide and an olefinically unsaturated compound, such as the carbonyl groups in the copolymer's main chain or other functional groups which may be present in the copolymer's olefinic monomer units. Very suitable reactive groups are primary amino groups. Examples of such polymers are amino capped poly(ethene oxide)s and poly(ethene oxide)-poly(propene oxide) block copolymers. The grafting may suitably be carried out in-situ, i.e. as a process step in the preparation of the emulsion. The present invention also relates to polymers which are obtainable by grafting a polymer comprising a poly(ethene oxide) moiety in its molecular structure onto a copolymer of carbon monoxide with an olefinically unsaturated compound.

The emulsions of the copolymer of carbon monoxide with an olefinically unsaturated compound according to this invention have in general a stability level such that they do not show separation within 30 minutes, in particular there is no separation visible within 60 minutes. However, with a view at obtaining a high level of stability very suitable non-ionic surfactants have a poly(ethene oxide) block with a number average molecular weight of more than 1,000, preferably more than 1,200, and a lypophilic block with a number average molecular weight of more than 800, preferably more than 1,000. An example is a diblock copolymer of poly(ethene oxide)-poly(propene oxide) which has a molecular weight of about 3700 and of which the poly(ethene oxide) block represents 62% the block copolymers' weight (available under the trademark TERGITOL XH). Another example is a triblock copolymer of poly(ethene oxide)-poly(propene oxide)-poly(ethene oxide) which has a molecular weight of about 6500 and of which the poly(ethene oxide) blocks represent each 25% the block copolymers' weight (available under the trademark SYNPERONIC PE/P105). Preferred blockpolymer dispersants are the "pluronics" which is the trademark of BASF-Wyandotte. An example is Pluronic 88 which is a block copolymer of 80 wt % ethylene oxide and 20 wt % propylene oxide with the polyoxypropylene block in the middle with terminal polyoxyethylene blocks, said block copolymer having an average molecular weight of 8000. Mixtures of surfactants may also be used.

Other useful dispersants are those polymers made by reacting polyoxyethylene glycols with polyglycidyl polyethers of polyhydric phenols as described in U.S. Pat. Nos. 5,236,974 and 4,122,067 which are hereby incorporated by reference. The polyoxyethylene glycols have average molecular weight within the range of about 200 to about 20,000 and the polyglycidyl polyethers have average molecular weight of about 300 to about 2000. The polyoxyethylene glycols and polyglycidyl polyethers are reacted in the molar ratios of 2:1 to 1.2:1. The preferred dispersant is the reaction product of 2 mols of polyoxyethylene glycol (Carbowax 8000 obtained from Union Carbide) with 1 mol of a glycidyl polyether of bisphenol A having an epoxide equivalent weight of 450–550.

Examples of poly(ethene oxide)s which are suitable for grafting onto a copolymer of carbon monoxide and an olefinically unsaturated compound and with which an emulsion with a high stability level can be made are methoxy-poly(ethene oxide)-amine having a molecular weight of about 5000, mono-amino-capped diblock copolymers of poly(ethene oxide)-poly(propene oxide) having a molecular weight of about 2000, the poly(ethene oxide) block representing 70% of the weight of the diblock copolymer (available under the trademark JEFFAMINE M2070) and bis-amino-capped triblock copolymers of poly(propene oxide)-poly(ethene oxide)-poly(propene oxide) having a molecular weight of about 2000, the poly(ethene oxide) block representing 94% of the weight of the triblock copolymer (available under the trademark JEFFAMINE ED2001). Very good results, in particular with respect to emulsions which include a curing agent, can be achieved by applying a 50/50 (by weight) mixture of the mono-amino-capped diblock copolymer of poly(ethene oxide)-poly(propene oxide) indicated above as being available under the trademark JEFFAMINE M2070 and a block copolymer of the formula $(PE-PO-)_2N-CH_2CH_2-N(-PO-PE)_2$ wherein PE and PO designate poly(ethene oxide) blocks and poly(propene oxide) blocks, respectively, the block copolymer having a molecular weight of about 26,000 and the poly(ethene oxide) blocks together representing 80% of the weight of the block copolymer (available under the trademark SYNPERONIC T908).

The quantity of surfactant may range within wide limits and may be determined in each case by routine experimentation. Suitable quantities are in the range of 0.1–10% by weight, in particular in the range of 0.2–8% by weight, relative to the weight of the copolymer to be dispersed. The poly(ethene oxide) which may be grafted may suitably be used in a substantially lower quantity, such as in the range of 0.05–5% by weight, in particular in the range of 0.1–4% by weight, relative to the weight of the copolymer to be dispersed.

The aqueous diluent is typically present in a quantity of at least 26% by volume relative to the volume of the emulsion. Preferably the diluent and the copolymer are used in a weight ratio in the range of 1:2 to 5:1, in particular 1:1.5 to 2:1. As indicated hereinbefore, the aqueous diluent may be water but it may comprise an organic diluent which is miscible with water, such as a lower ketone or alcohol, for example methanol or methylethylketone. The term "lower" is to be understood in the sense that the compound comprises 5 or less carbon atoms per molecule. The organic diluent may be present in order to increase the stability or to decrease the viscosity of the emulsion. The aqueous diluent comprises water typically for at least 50% by weight, more typically for at least 60% by weight. The organic diluent may be present in a quantity of up to 50% by weight, typically up to 40% by weight, for example in a quantity in the range of 1–30% by weight, relatively to the weight of the aqueous diluent.

The grafting may be carried out by admixing the poly(ethene oxide) and the copolymer of carbon monoxide and an olefinically unsaturated compound and allowing time for reaction to a sufficient degree, if necessary by applying heat. A catalyst may be added to shorten the reaction time or to enable a lower reaction temperature to be applied. If the reactive group is a primary amino group, a suitable catalyst is a weak acid of the same nature, and it can be used in the same quantity, as described hereinafter for catalyzing the curing reaction of the copolymer of carbon monoxide and an olefinically unsaturated compound with a poly-primary-amine. In this case the grafting may suitably be carried out at a temperature in the range of 0°–150° C., in particular 10°–100° C.

Emulsions according to this invention may be prepared by admixing the aqueous diluent with a mixture of the emulsifier and the copolymer of carbon monoxide and an olefinically unsaturated compound, and applying shear during and/or after the admixing to shear, for example by using a propeller mixer or a colloid mill. For preparing the curable resin composition, the curing agent, any curing catalyst, or any further curing catalyst, and any additional components may be added immediately thereafter or in a later stage, if desired just before the application to the wood parts.

In the emulsions according to this invention the particle size of the dispersed phase may vary between wide limits. The particle size is preferably in the range of 0.05–100 μm, more preferably in the range of 0.1–50 μm. The viscosity of the emulsions may also vary between wide limits. Preferred viscosities, in particular with a view at the ability of the emulsions to be applied by spraying, are in the range of 0.3 mPa.s–5 Pa.s, in particular 0.5 mPa.s–2 Pa.s, when measured at a temperature in the range of 10°–80° C.

Many curing agents can in principle be used. Suitable curing agents or curing systems are disclosed in EP-A-372602 and may comprise, for example, an amine, a thiol or acrylonitril. With some of these reagents a derivative of the copolymer of carbon monoxide and an olefinically unsaturated compound is initially formed and the derivative thus formed can be further cured using known methods.

The curing agent is preferably a polyamine, in particular a poly-primary-amine. A very suitable amine having three primary amino groups in its molecular structure is 2,4,6-triamino-1,3,5-triazine or melamine. The curing agent comprises more in particular two primary amino groups in its molecular structure. Such a compound may be of the general formula $H_2N-R-NH_2$, wherein R denotes a bivalent organic bridging group typically having up to 20 carbon atoms in the bridge, more typically up to 10 carbon atoms and in particular from 2 to 6 carbon atoms. The bridging group may contain heteroatoms in the bridge or in substituent groups attached to the bridge. The bridging group may be aromatic, but for the sake of a rapid cure it is preferably an aliphatic bridging group, in particular an alkylene group, more in particular a straight chain alkylene group. Examples of suitable diamines are 2,4-diaminotoluene, bis(4-aminophenyl)methane, bis(4-aminocyclohexyl)methane, diethylenetriamine and tetraethylenepentamine. Straight chain aliphatic diamines are, for example, 1,2-diaminoethane, 1,3-diaminopropane, 1,4-diaminobutane and, in particular, 1,6-diaminohexane. In view of the achievements of a rapid initial cure (so-called gelling) and a high mechanical strength of the composite after prolonged curing, it may be advantageous to employ a mixture of curing agents, in particular a mixture of a relatively more reactive curing agent and a less reactive curing agent, such as 1,6-diaminohexane and 2,4-diaminotoluene.

The degree of cross-linking occurring during the curing is dependent, inter alia, of the quantity of curing agent used relative to the quantity of the copolymer of carbon monoxide and an olefinically unsaturated compound. The relative quantity of curing agent may vary between wide ranges and by routine experimentation a preferred relative quantity can be established. When a poly-primary-amine is used as curing agent the molar ratio of the carbonyl groups in the copolymer and the primary amine groups of the curing agent is suitably in the range of from 0.25 to 8.0 and more suitably in the range of from 0.5 to 4.0.

The curing of the copolymer may be carried out in the presence of a curing catalyst or in the absence of any curing catalyst. Advantages of using a catalyst will generally be that the curing can be carried out at a lower temperature or during a shorter period of time. For the various curing reactions indicated hereinbefore suitable catalysts may be known in the art. When the curing agent is a poly-primary-amine suitable catalysts are weak acids, in particular acids having a pKa in the range of from 2 to 5.5, preferably in the range of from 2.5 to 5, when measured in water at 20° C. A preferred class of acids are the organic acids, in particular carboxylic acids, because these are at least to some extent soluble in the copolymer to be cured. The carboxylic acids have typically up to 20 carbon atoms. Monocarboxylic acids are more preferred due to their generally better solubility in the copolymer. Examples of monocarboxylic acids are nicotinic add, pivalic acid, valeric acid, acetic acid, benzoic acid and, in particular, salicylic acid. Another suitable weak acid is phosphoric acid.

The weak acid may be used in small quantities. Suitable quantities are from 0.1 to 15.0% by weight relatively to the weight of the copolymer. More suitably, the weak acid is used in a quantity of from 0.2 to 10.0% by weight, in particular 0.5–8.0% w, on the same basis.

The binder may contain additional components such as thickening agents, flame retardants, gap filling agents, antioxidants, UV stabilizers and colorants. A suitable gap filling agent is silica, cereal flour or coconut shell flour. Suitable thickeners are, for example, sodium carboxymethyl cellulose and other cellulose derivatives, natural gums and clays.

The present binder system may advantageously be stored, handled and used in the form of a kit of parts as indicated hereinbefore. The first and/or the second part may comprise a curing catalyst as an additional component. The diluent of the second part is typically an aqueous diluent, for example water or a mixture of water with a water-miscible organic diluent such as a lower alcohol, in particular methanol, or a lower ketone, in particular ethylmethylketone. The binder for use in this invention can be prepared by admixing the compositions of the first part and the second part of the kit, on the understanding that when the first part of the kit comprises an emulsifiable composition an emulsion may firstly be prepared by dispersing the emulsifiable composition in an aqueous diluent.

Very advantageously, the second part of the kit comprises, dissolved in an aqueous or polar organic diluent, a poly-primary-amine in combination with a weak acid which can be used as the curing catalyst in the curing of the copolymer with the poly-primary-amine, as described hereinbefore. Namely, it has been found that by combining the poly-primary-amine with the weak acid, or a part thereof, the quantity of diluent needed to dissolve the ingredients may be less (for example at least 10% less, more typically at least 20% less) than the quantity which would be needed to dissolve the poly-primary-amine alone using the same conditions, for example using a temperature of 20° C. In this embodiment of the invention the second part of the kit contains suitably the poly-primary-amine in a quantity of 60–97% by weight, in particular 70–95% by weight, the weak acid in a quantity of 0.25–10% by weight, in particular 0.5–5% by weight, and the diluent in a quantity of 3–40% by weight, in particular 5–20% by weight, these quantities being relative to the weight of the second part. Examples of a preferred second part are liquids containing 1,6-diaminohexane, salicylic acid and water in a weight ratio of 88:2:10 or 1,6-diaminohexane, salicylic acid and ethylmethylketone in a weight ratio of 88:2:10.

The species and the form of the wood parts which are used for producing the laminated composites are not critical. The wood may be a high or a low density wood and it may be a deciduous or a coniferous wood. Examples of suitable species are oak, chestnut, ash, maple, teak, okoume, mahogany, meranti and pine. Very good results can be obtained with beech, spruce and poplar. The wood does not need any pre-treatment other than which may normally be applied when a conventional binder is used. It is generally sufficient to bring the wood parts in the size and shape desired for the type of laminate composite to be produced. Suitably the wood is used in the form of planks, veneers, timber or lamellae.

The binder may be applied to the wood surface using any conventional technique, for example, by using a brush or a roller. A special advantage of using the binder in the form of an emulsion is that the binder can be applied by spraying, for example, by means of a nozzle driven by a compressed gas, such as in continuous in-line spraying, or by means of a paint-sprayer.

The quantity of binder relative to the quantity of wood may vary between wide limits. This quantity may be specified per square meter of joint present between adjacent wood pans. Per square meter of joint such a quantity of binder is typically used which is based on 5–400 g and in particular 10–300 g of the copolymer of carbon monoxide and an olefinically unsaturated compound. As set out hereinbefore, wood laminates may be produced which possess advantageous high-temperature properties. In such a case the layer of binder will be kept thin, for example, such that a quantity of binder is used per square meter of joint which is based on 5–60 g, in particular 10–40 g of the copolymer. As indicated hereinbefore, the application of a binder in the form of an emulsion, instead of in the form of a paste, enables the production of laminated wood composites with a better quality when the application rate of the binder is very low. This is the case when a quantity of binder is used per square meter of joint which is based on less than 30 g, in particular less than 25 g, and more in particular less than 20 g, of the copolymer.

After, or simultaneously with, applying the binder onto the wood surface the wood parts are brought together, such that binder resides between adjacent wood parts, and curing conditions are applied. The laminated composite may be layered in one or more directions, typically one or two directions. The number of layers in any of such directions may vary to a large extent; a practicable number of layers may range, for example, from 2 up to 50 or even 60. Usually the curing is effected by increasing the temperature. Pressure may be applied during the curing in order to effect that a larger portion of the binder is present in thin binder layers between the wood parts, and to increase the density of the wood composite to be produced. The temperature and the pressure may vary between wide limits. The temperature will generally be dependent of the curing agent and the presence of a curing catalyst. The pressure may, in addition, be dependent of the species of the wood and, in particular, of the type of wood parts. When a poly-primary-amine is used as curing agent the temperature will suitably be above 50° C., for example in the range of from 80° to 200° C., in particular 100° to 160° C. Typical pressures are in the range of from 1 to 30 kg/cm², in particular from 2.5 to 25 kg/cm², but higher and lower pressures are also possible. By routine experimentation the skilled person will be able to determine suitable curing times.

Various types of wood composites can be produced according to this invention, such as plywood and laminated beam or timber. The composites have an excellent impact resistance/strength balance and in the presence of moisture they have an excellent dimensional stability. Furthermore, they have outstanding electrical properties, such as a very low electrical conductivity and a very high electrical strength. Hence, the composites can advantageously be applied in the production of, for example, doors, parquet flooring, sport articles, such as hockey sticks, and electrical appliances, such as switch boards and panels for distributing boxes.

The aqueous emulsion of a copolymer of carbon monoxide with an olefinically unsatruated compound is also useful for coatings applications and adhesives applications.

The invention will be further illustrated by means of the following examples which are provided for illustrative purposes and are not to be construed as limiting the invention.

EXAMPLE 1

(for comparison)

A linear alternating carbon monoxide/propene copolymer was prepared as follows.

A mechanically stirred autoclave with a volume of 300 ml was charged with 100 ml methanol and 15 g propene. The autoclave was closed and flushed with carbon monoxide. The contents of the autoclave were heated to 70° C. Carbon monoxide was forced in to obtain a pressure of 50 bar. A solution of 357 mg cobalt perchlorate, 1.5 g naphthoquinone, 43.2 mg 1,3-bis(diethylphosphino)propane and 41.9 mg palladium acetate in 10 ml tetrahydrofuran was introduced into the autoclave. The pressure was maintained at 50 bar by continuously introducing carbon monoxide. After 22 hours the contents of the autoclave were cooled and the pressure was released. The polymer product was worked-up by flashing off the volatiles.

A polymer was obtained which had the appearance of a viscous oil. GPC analysis revealed that the polymer had a weight average molecular weight of 2600.

A binder composition was prepared as follows.

A sample of the copolymer of carbon monoxide and propene was mixed at 60° C. with a molten sample of 1,6-diaminohexane. A mixture of salicylic acid and methanol was added to the mixture. The quantities of the ingredients were such that in the resulting mixture the weight ratio of copolymer, 1,6-diaminohexane, salicylic acid and methanol was 3:0.9:0.2:0.021. After cooling to ambient temperature a paste like material was obtained.

EXAMPLE 2

(for comparison)

Four uni-axial two-ply wood samples according to EN 204 were prepared using 5 mm thick beech lamellae and, as the binder, a paste prepared according to comparative Example 1. The binder was evenly distributed at one lamellae surface at a rate of 90 g per m², calculated on the total weight of the copolymer of carbon monoxide and propene, 1,6-diaminohexane and salicylic acid (90 g per m² joint). The lamellae were combined with the grains parallel, placed in a pre-heated press and held therein for one hour at 140° C. and at a 20 kg/m² laminate cross section pressure.

The shear strength, measured according to EN 204, was 10.6±1.4 MPa on average.

In a similar experiment the binder was applied at a rate of 40 g per m² joint. The shear strength was 11.5±0.5 MPa on average.

EXAMPLE 3

A linear alternating copolymer of carbon monoxide and propene was produced as follows.

A mechanically stirred autoclave with a volume of 300 ml was charged with 70 ml methanol and 30 g propene. The autoclave was closed and flushed with carbon monoxide. The contents of the autoclave were heated to 85° C. Carbon monoxide was forced in to obtain a pressure of 72 bar. A solution of 6.9 mg trifluoromethanesulfonic acid, 12.3 mg 1,3-bis[bis(2-methoxyphenyl)phosphino]propane, 4.94 mg palladium acetate and 8.7 mg pyridine in 10 ml tetrahydrofuran was introduced into the autoclave. The pressure was maintained at 72 bar by continuously introducing carbon monoxide. After 40 hours the contents of the autoclave were cooled and the pressure was released. The polymer product was worked-up by flashing off the volatiles.

A polymer was obtained which had the appearance of a viscous oil. GPC analysis revealed that the polymer had a weight average molecular weight of 4180.

EXAMPLE 4

A binder in the form of an aqueous emulsion was produced as follows.

A 15-g sample of a copolymer prepared according to Example 3 was stirred with 1.5 g of a bis-amino capped triblock copolymer of poly(propene oxide)-poly(ethene oxide)-poly(propene oxide) having a molecular weight of about 2000 and the poly(ethene oxide) block representing about 94% of the triblock copolymer's weight (obtained under the trademark JEFFAMINE ED2001) at 50° C. for one hour. The mixture was left overnight at ambient temperature. Water (10 g) was added in 0.5-g portions while the mixture was subjected to high-shear stirring. The resulting emulsion could be stored for days at ambient temperature without visible signs of separation of the emulsion.

A molten sample of 1.6-diaminohexane (0.3 g per g copolymer) was added within two minutes to a stirred sample of the fresh emulsion.

EXAMPLE 5

Four uni-axial two-ply wood samples according to EN 204 were prepared using 5 mm thick beech lamellae and, as the binder, the emulsion prepared according to Example 4. The binder was applied at a rate of 90 g per m², calculated on the total weight of 1,6-diaminohexane and the copolymer of carbon monoxide and propene (90 g per m² joint). Other procedures were as indicated in Example 2.

The shear strength, measured according to EN 204, was 12.1±0.6 MPa on average.

EXAMPLE 6

A binder in the form of an aqueous emulsion was produced as follows.

A 15-g sample of a copolymer prepared according to Example 3 was stirred with 0.1 g salicylic acid and 0.5 g of methoxypoly(ethene oxide)amine having a molecular weight of about 5000 at 50° C. for one hour. The mixture was left overnight at ambient temperature. Water (10 g) was added in 0.5-g portions while the mixture was subjected to high-shear stirring. The resulting emulsion could be stored for days at ambient temperature without visible signs of separation of the emulsion.

A molten sample of 1.6-diaminohexane (0.3 g per g copolymer) was added within two minutes to a stirred sample of the fresh emulsion. The resulting emulsion remained processable for at least one hour.

EXAMPLE 7

An aqueous emulsion was produced as follows.

A 15-g sample of the copolymer prepared according to Example 3 was stirred with 0.1 g salicylic acid and 1.5 g of a triblock copolymer of poly(ethene oxide)-poly(propene oxide)-poly(ethene oxide) which has a molecular weight of about 6500 and of which the poly(ethene oxide) blocks represent each 25% the copolymers' weight (obtained under the trademark SYNPERONIC PE/P105) at 50° C. for one hour. The mixture was left overnight at ambient temperature. Water (10 g) was added in 0.5-g portions while the mixture was subjected to high-shear stirring. The resulting emulsion could be stored for days at ambient temperature without visible signs of separation of the emulsion.

EXAMPLE 8

A binder in the form of an aqueous emulsion was produced as follows.

A 15-g sample of a copolymer prepared according to Example 3 was stirred at 100° C. for 90 minutes with a mixture of 0.75 g of a mono-amino-capped diblock copolymer of poly(ethene oxide)-poly(propene oxide) having a molecular weight of about 2000, the poly(ethene oxide) block representing 70% of the weight of the diblock copolymer (obtained under the trademark JEFFAMINE M2070) and 0.75 g of a block copolymer of the formula (PE—PO—)$_2$N—CH$_2$—CH$_2$—N(—PO—PE)$_2$ wherein PE and PO designate poly(ethene oxide) blocks and poly(propene oxide) blocks, respectively, the block copolymer having a molecular weight of about 26,000 and the poly(ethene oxide) blocks together representing 80% of the weight of the block copolymer (obtained under the trademark SYNPERONIC T908). The mixture was left overnight at ambient temperature. Water (15 g) was added in 1.0-g portions while the mixture was subjected to high-shear stirring. The resulting emulsion could be stored for weeks at ambient temperature without visible signs of separation of the emulsion.

Two days after the preparation of this emulsion a molten sample of 1.6-diaminohexane (0.3 g per g copolymer) was added within two minutes to a stirred sample of the emulsion. The resulting emulsion remained processable and curable for at least one week.

EXAMPLE 9

An aqueous emulsion was produced as follows.

A 250-g sample of a copolymer prepared according to example 3 was stirred with 25 g of Pluronic F-88 (obtained from BASF-Wyandotte) and 55 g of D.I.water at 30° C. for 4 hours. The mixture was left overnight at ambient temperature. 100 g water was added in 0.5 g portions while the mixture was subjected to high-shear stirring. The resulting emulsion has an average particle size of 0.73 um. The emulsions could be stored for days at ambient temperature without visible signs of separation of the emulsion.

EXAMPLE 10

An aqueous emulsion was produced as follows.

A 250-g sample of a copolymer prepared according to example 3 was stirred with 25 g of a surfactant made by reacting 2 mols of polyoxyethylene glycol (Carbowax 8000 obtained from Union Carbide) with 1 mol of a glycidyl polyether of Bisphenol A having an epoxide equivalent weight of 468 and 55 g of D.I. water at 30 C. for 4 hours. The mixture was left overnight at ambient temperature. 100 g of D.I.water was added in 0.5 g portions while the mixture was subjected to high-shear stirring. The resulting emulsion has an average particle size of 0.93 um. The emulsion was stable for more than 18 months at ambient temperature without visible signs of separation.

EXAMPLE 11

An aqueous emulsion was produced as follows.

A 250 g sample of a copolymer with a weight average molecular weight 2870 prepared by the procedure described in example 3 was stirred with 25 g of a surfactant made by reacting 2 mols of polyoxyethylene glycol (Carbowax 8000 obtained from Union Carbide) with 1 mol of a glycidyl polyether of Bisphenol A having an epoxide equivalent weight 468 and 55 g of D.I. water at 30 C. for 4 hours. The mixture was left overnight at ambient temperature. 100 g of D.I. water was added in 0.5 g portions while the mixture was subjected to high-shear stirring. The resulting emulsion has an average particle size of 0.4 nm. The emulsion could be stored for days at ambient temperature without visble signs of separation of the emulsion.

EXAMPLE 12

The same procedure as outlined in Example 9 was used, except 25 g of polyoxyethylene glycol (Carbowax 8000 obtained from Union Carbide) was used as a surfactant in place of the Pluronic F-88. The resulting mixture could not be dispersed in water.

We claim:

1. An emulsion of a copolymer of carbon monoxide with an olefinically unsaturated compound dispersed in an aqueous diluent which comprises water for at least 50% by weight of the aqueous diluent wherein the aqueous diluent and the copolymer are present in a weight ratio in the range of 1:2 to 5:1.

2. The emulsion of claim 1 wherein the weight ratio is in the range of 1:1.5 to 2:1.

3. The emulsion as claimed in claim 1 wherein the copolymer is a linear alternating copolymer of carbon monoxide and an olefinically unsaturated compound.

4. The emulsion as claimed in claim 1 wherein the copolymer has a weight average molecular weight in the range of from 500 to 5000, and the copolymer is based on olefinically unsaturated compounds which comprise an α-olefin having three or more carbon atoms.

5. The emulsion of claim 1 further comprising a non-ionic surfactant which comprises in its molecular structure a hydrophilic moiety which is a poly(ethene oxide) block and a lypophilic moiety.

6. The emulsion of claim 5 wherein the lypophilic moiety is a moiety of poly(alkylene oxide) wherein alkylene is other than ethene.

7. The emulsion of claim 6 wherein the lypophilic moiety is selected from the group consisting of propene and 1-butene.

8. The emulsion of claim 5 wherein the surfactant is a graft surfactant which is obtained by grafting a polymer comprising a poly(ethene oxide) moiety and a primary amino group onto a copolymer of carbon monoxide with an olefinically unsaturated compound.

9. The emulsion of claim 5 wherein the hydrophilic moiety is a poly(ethene oxide) block having a number average molecular weight of more than 1,000 and the lypophilic moiety has a lypophilic polymer block having a number average molecular weight of more than 800.

10. The emulsion of claim 9 wherein the amount of surfactant present is in the range of 0.1–10% by weight, relative to the weight of the copolymer having been dispersed.

11. The emulsion of claim 8 wherein the amount of surfactant present in an amount which is obtainable by grafting 0.05–5% by weight, of the polymer comprising a poly(ethene oxide) moiety and a primary amino group, relative to the weight of the copolymer of carbon monoxide with an olefinically unsaturated compound having been dispersed.

12. The emulsion of claim 5 wherein the lypophilic moiety is a copolymer of carbon monoxide and an olefinically unsaturated compound.

13. The emulsion of claim 8 wherein the polymer comprising a poly(ethene oxide) moiety and a primary amino group is an amino capped poly(ethene oxide) or poly(ethene oxide)-poly(propene oxide) block copolymer.

14. An emulsion of a copolymer of carbon monoxide with an olefinically unsaturated compound dispersed in an aqueous diluent which comprises water for at least 50% by weight of the aqueous diluent and a non-ionic surfactant wherein the surfactant is a graft surfactant which is obtained by grafting a polymer comprising a poly(ethene oxide) moiety and a primary amino group onto a copolymer of carbon monoxide with an olefinically unsaturated compound.

15. The emulsion of claim 14 wherein the polymer comprising a poly(ethene oxide) moiety and a primary amino group is selected from an amino capped poly(ethene oxide) and poly(ethene oxide)-poly(propene oxide) block copolymer.

16. The emulsion of claim 9 wherein the poly(ethene oxide) block has a number average molecular weight of more than 1,200 and the lypophilic polymer block has a number average molecular weight of more than 1,000.

17. An emulsion of a copolymer of carbon monoxide with an olefinically unsaturated compound dispersed in an aqueous diluent which comprises water for at least 50% by weight of the aqueous diluent and a non-ionic surfactant which comprises in its molecular structure a hydrophilic moiety which is a poly(ethene oxide) block having a number average molecular weight of more than 1,000 and a lypophilic moiety which is a lypophilic polymer block having a number average molecular weight of more than 800 wherein the amount of surfactant present is in the range of 0.1–10% by weight, relative to the weight of the copolymer having been dispersed.

18. The emulsion of claim 17 wherein the hydrophilic moiety is a poly(ethene oxide) block having a number average molecular weight of more than 1,200 and the lypophilic moiety is a lypophilic polymer block having a number average molecular weight of more than 1,000.

19. The emulsion of claim 17 wherein the mount of surfactant present is an mount which is obtained by grafting 0.05–5% by weight, of the polymer comprising a poly(ethene oxide) moiety and a primary amino group, relative to the weight of the copolymer of carbon monoxide with an olefinically unsaturated compound having been dispersed.

* * * * *